US006049959A

United States Patent [19]
Grondahl

[11] Patent Number: 6,049,959
[45] Date of Patent: Apr. 18, 2000

[54] METHOD AND MACHINE FOR MAKING A SPRING-MATTRESS WEB AND A SPRING-MATTRESS WEB

[75] Inventor: Sven Grondahl, Stockholm, Sweden

[73] Assignee: Dux Design AB, Trelleborg, Sweden

[21] Appl. No.: 08/765,891

[22] PCT Filed: Apr. 9, 1996

[86] PCT No.: PCT/SE96/00449

§ 371 Date: Jan. 6, 1997

§ 102(e) Date: Jan. 6, 1997

[87] PCT Pub. No.: WO96/35637

PCT Pub. Date: Nov. 14, 1996

[30] Foreign Application Priority Data

May 8, 1995 [SE] Sweden .................................. 9501695

[51] Int. Cl.[7] .............................. B65B 51/07; B65B 1/24; B65G 7/00

[52] U.S. Cl. ............................... 29/91.1; 29/430; 29/451; 29/782; 29/783; 29/787; 29/795; 29/819; 29/822; 53/114; 53/436

[58] Field of Search .............................. 29/91, 91.1, 451, 29/430, 782, 783, 787, 791, 795, 819, 822; 53/114, 436

[56] References Cited

U.S. PATENT DOCUMENTS 1,700,339 1/1929 Suekoff .................................... 29/91.1
1,861,429 5/1932 Schneider et al. .
2,716,308 8/1955 Hodges, Jr. ............................. 29/91 X
3,585,700 6/1971 Jansson ................................. 53/436 X
4,523,344 6/1985 Stumpf et al. .
4,854,023 8/1989 Stumpf ........................................ 29/91
5,471,725 12/1995 Thrasher ................................. 29/91.1
5,497,600 3/1996 Rodgers ................................ 53/436 X
5,613,287 3/1997 St. Clair .................................. 29/91.1
5,749,133 5/1998 Mauldin et al. ....................... 29/430 X
5,764,517 6/1998 Cox et al. ............................ 29/787 X

FOREIGN PATENT DOCUMENTS 3-251284 11/1991 Japan ......................................... 29/91
WO 90/01285 2/1990 WIPO .
WO 91/05732 5/1991 WIPO .

*Primary Examiner*—Joseph M. Gorski
*Attorney, Agent, or Firm*—Pillsbury Madison & Sutro LLP

[57] ABSTRACT

For making a mattress web having two fabric webs which are attached to one another in a transverse direction of the web by seams that are spaced apart in a longitudinal direction of the, thereby to form a succession of sleeves, each of which contains a slightly tensioned spring, one of the fabric webs is continuously conveyed in the longitudinal direction in such a manner as to be supported from below. An upwardly opening curve is formed in the transverse direction. A respective spring is introduced into each curve from above, the spring being non-tensioned and having a height exceeding the curve depth. While in the curve, the spring is compressed in the vertical direction under the action of a force acting at a distance from the downstream wall of the curve, and the curve, with the compressed spring therein, is brought together with the other of the two fabric webs, which is continuously conveyed in a longitudinal direction. The other fabric web is attached to the downstream edge of the curve, and the spring-compressing force is cancelled while the top fabric is kept close to the opening of the curve.

5 Claims, 2 Drawing Sheets

FIG I

METHOD AND MACHINE FOR MAKING A SPRING-MATTRESS WEB AND A SPRING-MATTRESS WEB

This application is the national phase of international application PCT/SE96/00449, filed Apr. 9, 1996 which designated the U.S.

BACKGROUND OF THE INVENTION

This invention concerns a method and a machine for making a spring-mattress web. The invention further relates to a mattress web made using the machine of the invention, in accordance with the method of the invention.

WO 91/05732 teaches a method and a machine for encapsulating elongated springs between two fabric webs, thereby to produce a mattress web.

One drawback of this prior art technique is that, when the shuttle by means of which a spring is introduced between the fabric webs is retracted, there is a considerable risk that the friction between the shuttle and the spring as well as between the webs and the spring will stretch the spring in its longitudinal direction, such that the spring will, when trying to revert to a non-tensioned state, contract or crease the webs. As a result, the webs have to be stretched in the transverse direction in the mattress web or in the mattress blank separated from the mattress web, which is a costly operation.

SUMMARY OF THE INVENTION

The object of this invention is to provide a method and a machine which do not suffer from this drawback.

A mattress web made in the inventive machine in accordance with the inventive method is encompassed by the protective scope of the appended claims directed to a mattress web. A mattress cut off from such a mattress web constructed in accordance with the principles of the present invention is, owing to the fact that its bottom fabric and top fabric are connected to one another on the one side of the web, more flexible and, hence, more comfortable than a mattress made from the mattress web according to WO 91/05732, whose spring-accommodating sleeves are attached to one another at the middle.

Thus, the basic concept of the present invention is that the spring is to be introduced, in non-tensioned state and in its longitudinal direction, into a curve or pocket formed in a fabric web and that the curve with the spring therein is to be closed by means of the other fabric web, such that the spring is slightly compressed, as it should be in the mattress web, but however is non-tensioned in its longitudinal direction, resulting in the elimination of the fabric-creasing forces arising in the prior art technique.

BRIEF DESCRIPTION OF THE DRAWINGS

The invention will now be described in more detail with regard to an embodiment of a machine for implementing the method of the invention. In the accompanying drawings.

Figure 1:
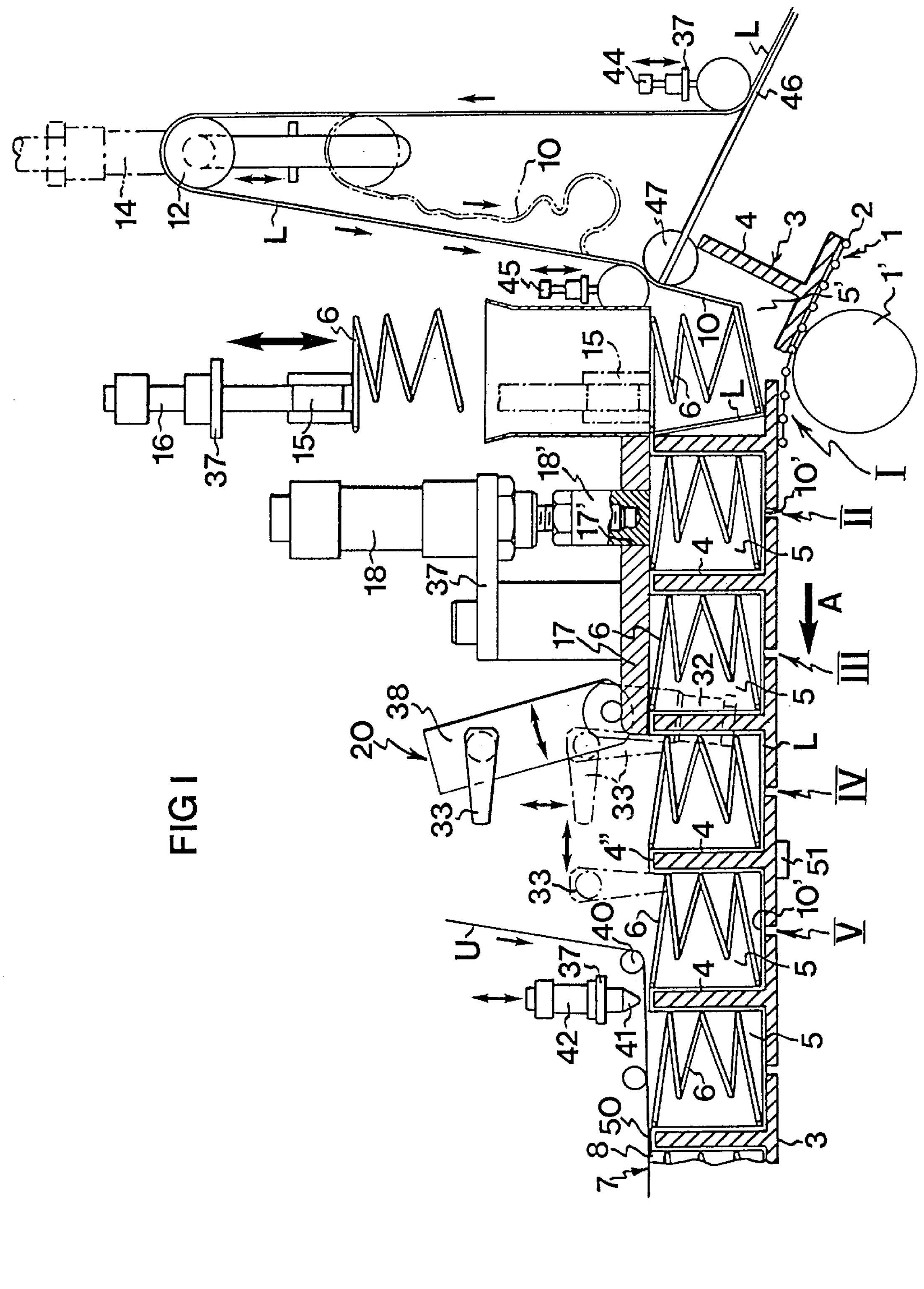
FIG. 1 is a partly sectional and partly schematic side view of the machine.

Thus, the illustrated machine comprises an endless conveyor belt 1, which is made up of chains 2 and T-sections 3 which with their crossbars are connected to the chains in the transverse direction of the conveyor belt, such that the stems 4 of the T-sections point upwards in the upper run of the belt.

The chains are driven by chain wheels (not shown) and a motor in unison fashion with an indexed movement, the step length corresponding to the width of grooves 5 of equal width formed between two successive T-sections 3.

DETAILED DESCRIPTION

During its indexed movement, the conveyor belt 1 travels in the direction indicated by the arrow A past stations I–V, the mutual distance of which is an indexation step.

The conveyor belt 1 conveys a bottom fabric L and springs 6 from station I to station V. After station V, the conveyor belt conveys a finished mattress web 7, in which parallel sleeves 8 arranged in the transverse direction of the belt each contains a spring 6, which is slightly compressed in the vertical direction. These sleeves are formed of the bottom web L and a top web U, which are attached to one another in the transverse direction of the conveyor belt. Lengths of the mattress web can be cut off between the sleeves 8 in order to produce mattress blanks, the ends of the sleeves being sealed in some suitable manner to form a finished mattress.

There follows a description of the passage of a groove, a curve and a spring from station I to station V.

The bottom web L is conveyed to station I from a freely rotatable storage roller (not shown). In station I, the bottom web is formed with a downwardly-bulging curve 10 in the groove 5'. The groove is not fully formed here, and the conveyor belt here passes from an angle portion (guide roller 1') to a horizontal run. In the angle portion, two successive T-sections move towards one another, so that their stems 4 will form the flanges of the fully-formed U-shaped groove 5. This angular closing of the stems of the T-sections entails that the formation of the curve of the bottom web need not be excessively precise, i.e. the curve will in reliable fashion be placed in the groove 5.

The curve 10 of the bottom web is formed by moving a guiding bar 12, over which the bottom web travels, from an upper position, in which the bottom web is stretched, to a lower position, in which the bottom web is slack and forms the curve 10. The displacement is brought about by a piston and cylinder arrangement 14, whose stroke length is such that the curve 10 of the bottom web will, in stretched state, have a width corresponding to the width of the groove when in stretched state.

As a result of the upward displacement of the guiding bar 12, a new length of the bottom web of the indicated width is retrieved from the storage roller.

In the curve 10 thus formed in station I is introduced a metallic mattress spring in the vertical direction through the upwardly open curve opening. To this end, an electromagnet 15 is attached to a vertically reciprocating piston and cylinder arrangement 16. The electromagnet 15 is adapted to retain the spring during the downward stroke of the piston and cylinder arrangement 16 and to let go of the spring at the end of this downward stroke, when the piston and cylinder arrangement 16 compresses the spring 6, which is supported by the bottom of the groove 5' being formed.

At the end of the downward stroke, the conveyor belt 1 has further begun its indexation movement downstream towards station II and conveyed the groove 5' with its bottom-web curve and the compressed spring 6 therein under the bevelled upstream end 17 of a stationary sole plate 17. The sole plate 17 covers the groove (with the curve and spring therein) in the two following stations II and III with a slide fit therebetween, i.e. between the bottom web portion laid over the stems 4 and the top surface of the slightly compressed spring 6.

In station II, the groove 5' is fully formed (parallel side walls 4, reference numeral 5) and the curve 10 is stretched where it closely follows the side walls and the bottom of the groove, thus forming a pocket 10'. To this end, there is provided a vertically reciprocating piston and cylinder arrangement 18, which supports a bar 18' adapted to run through an opening 17' in the sole plate 17, so as to compress the spring 6 against the bottom of the curve in such a manner that it is supported by the bottom of the groove, so that the curve will be brought to its stretched state to form the rectangular pocket 10', and the fabric portion in station III is prevented from moving backwards (against the direction of the arrow A).

In station III, there are not taken any steps affecting the bottom web pocket 10' or the spring 6, but the station merely serves to stabilise the stretched shape of the pocket.

In station IV, the groove 5 and the pocket 10' therein are again open, and the spring is thus in non-tensioned state, such that its upper surface projects somewhat above the openings of the groove and the pocket. In this station, the pocket is prepared for closing by means of the top web, thereby to form the sleeve 8 containing the slightly compressed spring.

Figure 2:
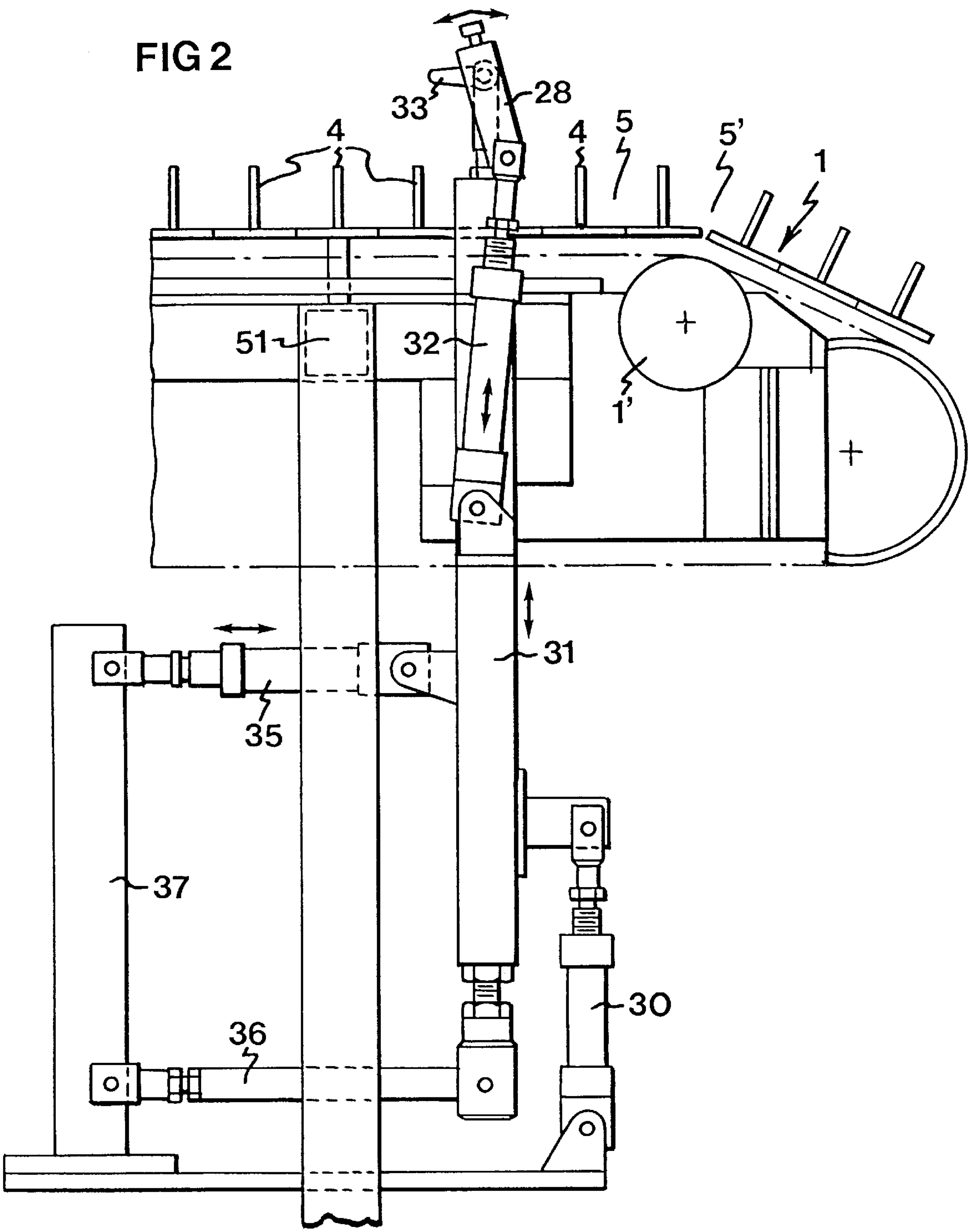
FIG. 2 is a view of a spring-holder device.

A piston and cylinder arrangement 30 (FIG. 2) is adapted to vertically reciprocate a strip holder 31; a piston and cylinder arrangement 32 is adapted to reciprocatingly pivot a spring-compressing strip 33 about an axis parallel to its one edge; and a piston and cylinder arrangement 35 is adapted to return the strip holder 31 to the neutral position.

The strip holder 31 is slidably mounted for vertical motion in the machine frame. The strip holder is mounted in the machine frame 37 by means of the piston and cylinder arrangements 30 and 35 as well as a rod 36. The piston and cylinder arrangement 30 is hingedly connected to the machine frame 37 at its lower end and is hingedly connected to the strip holder 31 at its upper end. The piston and cylinder arrangement 35 and the rod 36 are hingedly connected to the machine frame 37 at their respective ends. The piston and cylinder arrangement 32 is hingedly connected to the strip holder 31 and a link 32, to which the strip 33 is fixedly connected.

The piston and cylinder arrangement 35 is associated with a pressure-relief valve open in the central position.

The spring holder 20 operates as follows. The starting point is the neutral position illustrated in FIGS. 1 and 2 by full lines.

In station IV, the piston and cylinder arrangement 30 is, in a first step, activated so as to displace the strip holder 31 to a working position, which is indicated by dashed lines in FIG. 1. Then, the piston and cylinder arrangement 32 is, in a section operation, activated so as to pivot the strip 33 from its resting position to an active position, which is indicated by dashed lines in FIG. 1 and in which the strip with its front edge is applied against the upper surface of the spring, such that the spring is compressed in the pocket 10' against the bottom of the groove. The upper surface of the spring is then located below the openings of the pocket and the groove. Then, the pressure-relief valve of the piston and cylinder arrangement 35 is, in a third operation, activated so as to relieve the pressure of this arrangement, to enable to the conveyor belt 1 to entrain, in its next indexation step, the spring holder 20 by support engagement between the strip 33 and the upstream wall 4 of the groove 5.

This next indexation step moves the pocket 10' in the groove 5, the spring being pressed down in the pocket by the strip 33 of the spring holder, to station V, which is a welding station.

The top web is conveyed from a free-rolling storage roller (not shown) to the welding station via guide rollers 40. The bottom web L and the top web U are welded together by means of a vertically reciprocating welding rod 41, e.g. inductively heated, under the action of a piston and cylinder arrangement 42 mounted in the machine frame. This produces a linear welding joint 50 between the top and bottom webs, the downstream upper edge 4" of the groove and a support 51 acting as abutments.

After welding and cooling, the piston and cylinder arrangement 30 is caused to return the strip 33 to its resting position, and the piston and cylinder arrangements 32, 35 are caused to return the strip holder 31 to its resting position. The guide roller 40 is disposed above the pocket opening in proximity thereto, such that it and the top web contribute to keeping the spring 6 in place in the pocket.

The piston and cylinder arrangement 16 with the magnet 15 attached thereto is reciprocatingly displaceable also perpendicularly to its vertical direction of movement (for instance into and out of the plane of the drawing) in order to collect a spring 6 from a store.

At the inlet site for the bottom web L to the station I, there is provided a nip-producing piston and cylinder arrangement 44, 45 for this web on both sides of the rod 12. These arrangements operate alternatingly and concurrently with the vertical strokes of the rod in order to let go and nip the bottom web in cooperation with abutments 46, 47.

It is evident from the foregoing that the height of the spring 6, when the spring is non-tensioned in the vertical direction, slightly exceeds the height of the pocket 10. WO 90/01285 teaches a suitable spring (see FIG. 1).

Preferably, the material of the bottom and top webs L, U is of weldable type, such as plastic fabric. However, the invention encompasses other methods than welding for connecting these webs, such as sewing.

I claim:

1. A method for making a mattress web, comprising the steps of:

continuously indexing a first fabric web having a width incrementally to and through a succession of stations in a downstream direction;

at a first of said stations, (i) forming in each respective longitudinally successive increment of said first fabric web a curve that extends fully widthwise of said first fabric web and has a leading side, a trailing side, a bottom interconnecting the leading side to the trailing side, and an upwardly opening mouth defined by the leading side and the trailing side, and (ii) introducing a compression coil spring in a relaxed state downwardly through said mouth into said curve and against said bottom;

at a second of said stations downstream from said first station, (iii) supporting said bottom on a substantially horizontal planar surface, and (iv) vertically compressing said coil spring downwardly against said bottom while said bottom remains supported on said substantially horizontal planar surface, thereby placing said coil spring in a vertically compressed state and stretchingly transforming said curve into a pocket having a trailing upper surface, a leading upper surface, a trailing face, a leading face parallel to the trailing face, a bottom surface interconnecting and perpendicular to the trailing face and the leading face, and an upwardly extending opening defined by the leading upper surface and the trailing upper surface, whereby said coil spring in said vertically compressed state is located entirely within the pocket and the bottom surface is supported on said substantially horizontal planar surface;

at a third of said stations downstream from said second station, maintaining said coil spring in said vertically compressed state;

at a fourth of said stations downstream from said third station, (v) removing said coil spring from said vertically compressed state, thereby causing said coil spring to resume a relaxed state, and thereby causing an upper portion of said coil spring to extend upwardly above said upwardly extending opening, and then (vi) urging a tool against said coil spring, thereby vertically compressing said coil spring downwardly against said bottom surface while said bottom surface remains located on said substantially horizontal planar surface, and thereby placing said coil spring in a vertically compressed state entirely within said pocket; and then at a fifth of said stations downstream from said fourth station, (vii) while continually urging said tool against said coil spring and thereby maintaining said coil spring in said vertically compressed state entirely within said pocket, continuously feeding a second fabric web incrementally onto said first fabric web and welding a first portion of said second fabric web to the leading upper surface, thereby providing a welded pocket portion, then (viii) releasing said tool from said coil spring and conveying said welded pocket portion away downstream from said fifth station while applying a compressive force to said coil spring, thereby bringing the trailing upper surface to said fifth station with said coil spring in a compressed state, and then (ix) welding a second portion of said fabric web to the trailing upper surface, thereby capturing said coil spring in said pocket in a compressed state.

2. The method of claim 1, wherein:

both of said fabric webs comprise thermoplastic material, and said welding step comprises thermally welding thermoplastic material of said second fabric web to thermoplastic material of said first fabric web.

3. The method of claim 1, and further comprising the step of preventing the trailing side of the curve from moving in a direction opposite to the downstream direction during the vertically compressing step performed at the second station.

4. An apparatus for making a mattress web, comprising:

(A) means for continuously indexing a first fabric web having a width incrementally to and through a succession of stations;

(B) a first of said stations comprising:

(1) means for forming in each respective longitudinally successive increment of the first fabric web a curve that extends fully widthwise of the first fabric web and has a leading side, a trailing side, a bottom interconnecting the leading side to the trailing side, and an upwardly opening mouth defined by the leading side and the trailing side, and (2) means for introducing a compression coil spring in a relaxed state downwardly through the mouth into the curve and against the bottom;

(C) a second of said stations downstream from said first station and comprising:

(1) a substantially horizontal planar surface for supporting the bottom; and (2) first means for vertically compressing the coil spring downwardly against the bottom while the bottom remains supported on said substantially horizontal planar surface, thereby placing the coil spring in a vertically compressed state and stretchingly transforming the curve into a pocket having a trailing upper surface, a leading upper surface, a trailing face, a leading face parallel to the trailing face, a bottom surface interconnecting and perpendicular to the trailing face and the leading face, and an upwardly extending opening defined by the leading upper surface and the trailing upper surface, whereby the coil spring in the vertically compressed state is located entirely within the pocket and the bottom surface is supported on said substantially horizontal planar surface;

(D) a third of said stations downstream from said second station and including means for maintaining the coil spring in the vertically compressed state;

(E) a fourth of said stations downstream from said third station comprising:

(1) means for removing the coil spring from the vertically compressed state to thereby cause the coil spring to resume a relaxed state and thereby cause an upper portion of the coil spring to extend upwardly above the upwardly extending opening; and (2) second means for vertically compressing the coil spring downwardly against the bottom surface while the bottom surface remains located on said substantially horizontal planar surface to thereby place the coil spring in a vertically compressed state entirely within the pocket; and (F) a fifth station downstream from said fourth station, comprising:

(1) means for continuously feeding a second fabric web incrementally onto the first fabric web; and (2) means for (a) welding a first portion of the second fabric web to the leading upper surface while the coil spring remains compressed by said second means for vertically compressing to thereby maintain the coil spring in the vertically compressed state entirely within the pocket, thereby forming a welded pocket portion and (b) welding a second portion of said fabric web to the trailing upper surface after the coil spring is released by said second means for vertically compressing and said welded pocket portion is conveyed away from said fifth station by said indexing means, to thereby capture the coil spring in the pocket in a compressed state.

5. The apparatus according to claim 4, wherein the succession of stations includes an upper run of an endless conveyor belt having a plurality of inverted T-shaped elements, and wherein said means for forming includes immediately adjacent T-shaped elements that define an opening corresponding in shape to that of the pocket.

* * * * *